(12) United States Patent
Blair (10) Patent No.: US 9,053,596 B2
(45) Date of Patent: Jun. 9, 2015

(54) SYSTEMS AND METHODS FOR SPECTRAL AUTHENTICATION OF A FEATURE OF A DOCUMENT

(75) Inventor: Ronald Bruce Blair, Flower Mound, TX (US)

(73) Assignee: De La Rue North America Inc., Irving, TX (US)

( * ) Notice: Subject to any disclaimer, the term of this patent is extended or adjusted under 35 U.S.C. 154(b) by 315 days.

(21) Appl. No.: 13/563,612

(22) Filed: Jul. 31, 2012

(65) Prior Publication Data

US 2014/0037196 A1 Feb. 6, 2014

(51) Int. Cl.
*G07D 7/20* (2006.01)
*G07D 7/12* (2006.01)

(52) U.S. Cl.
CPC ............. *G07D 7/205* (2013.01); *G07D 7/122* (2013.01); *G07D 7/2058* (2013.01)

(58) Field of Classification Search
CPC ...... G07D 7/205; G07D 7/122; G07D 7/2058
USPC .................................................. 382/159, 173
See application file for complete search history.

(56) References Cited

U.S. PATENT DOCUMENTS

| | | | |
|---|---|---|---|
| 4,197,584 A | 4/1980 | Blazek | |
| 4,525,630 A | 6/1985 | Chapman | |
| 4,650,319 A | 3/1987 | Stenzel et al. | |
| 4,670,779 A | 6/1987 | Nagano | |
| 4,922,109 A | 5/1990 | Bercovitz et al. | |
| 4,935,628 A | 6/1990 | Martin et al. | |
| 5,304,813 A | 4/1994 | De Man | |
| 5,418,855 A | 5/1995 | Liang et al. | |
| 5,498,879 A | 3/1996 | De Man | |
| 5,578,813 A | 11/1996 | Allen et al. | |
| 5,740,223 A | 4/1998 | Ozawa et al. | |
| 5,844,682 A | 12/1998 | Kiyomoto et al. | |
| 5,923,413 A | 7/1999 | Laskowski | |
| 6,013,912 A | 1/2000 | Pautrat et al. | |

(Continued)

FOREIGN PATENT DOCUMENTS

| | | |
|---|---|---|
| CA | 2682467 A1 | 10/2008 |
| CN | 1288892 C | 12/2006 |

(Continued)

OTHER PUBLICATIONS

Final Office Action date mailed Dec. 19, 2013; U.S. Appl. No. 12/277,936.

(Continued)

*Primary Examiner* — Gregory M Desire
(74) *Attorney, Agent, or Firm* — R. Johnston Law, PLLC (57) ABSTRACT

Systems and methods for authenticating a document are provided. In one embodiment, a method for authenticating a feature of a document includes capturing a first image of a region of a document while the region is subjected to a first wavelength of electromagnetic radiation. The region includes at least a portion of the document. The method also includes determining a first intensity value associated with the first image of the region, and comparing the first intensity value with a first training intensity value of a region of a training document. The first training intensity value is obtained using the first wavelength of electromagnetic radiation. The method also includes determining whether the document is authentic at least partially based on the comparison between the first intensity value and the first training intensity value.

1 Claim, 9 Drawing Sheets

(56) References Cited

U.S. PATENT DOCUMENTS

| | | | |
|---|---|---|---|
| 6,111,261 A | 8/2000 | Bolza-Schunemann et al. | |
| 6,165,609 A | 12/2000 | Curatolo | |
| 6,178,228 B1 | 1/2001 | Schol | |
| 6,198,835 B1 | 3/2001 | Banton et al. | |
| 6,201,892 B1 | 3/2001 | Ludlow et al. | |
| 6,249,591 B1 | 6/2001 | Tullis | |
| 6,256,407 B1 | 7/2001 | Mennie et al. | |
| 6,347,163 B2 | 2/2002 | Roustaei | |
| 6,354,507 B1 | 3/2002 | Maeda et al. | |
| 6,400,470 B1 | 6/2002 | Takaragi et al. | |
| 6,405,929 B1 | 6/2002 | Ehrhart et al. | |
| 6,477,227 B1 | 11/2002 | Kaiser et al. | |
| 6,501,825 B2 | 12/2002 | Kaiser et al. | |
| 6,563,902 B2 | 5/2003 | Takahashi | |
| 6,766,045 B2 | 7/2004 | Slepyan et al. | |
| 6,774,986 B2 | 8/2004 | Laskowski | |
| 6,819,409 B1 | 11/2004 | Tompkin et al. | |
| 6,839,128 B2 | 1/2005 | Premjeyanth et al. | |
| 6,871,606 B2 | 3/2005 | Schweizer | |
| 6,909,770 B2 | 6/2005 | Schramm et al. | |
| 6,913,260 B2 | 7/2005 | Maier et al. | |
| 6,917,040 B2 | 7/2005 | Thierauf et al. | |
| 6,918,482 B2 | 7/2005 | Thierauf | |
| 6,937,322 B2 | 8/2005 | Gerz et al. | |
| 6,962,247 B2 | 11/2005 | Maier et al. | |
| 6,970,235 B2 | 11/2005 | Christophersen | |
| 7,006,204 B2 | 2/2006 | Coombs et al. | |
| 7,030,371 B2 | 4/2006 | Vasic et al. | |
| 7,054,461 B2 | 5/2006 | Zeller et al. | |
| 7,067,824 B2 | 6/2006 | Muller et al. | |
| 7,092,583 B2* | 8/2006 | Ahlers et al. | 382/280 |
| 7,133,124 B2 | 11/2006 | Puttkammer | |
| 7,184,133 B2 | 2/2007 | Coombs et al. | |
| 7,215,414 B2 | 5/2007 | Ross | |
| 7,218,386 B2 | 5/2007 | Alcock et al. | |
| 7,372,990 B2 | 5/2008 | Yamauchi et al. | |
| 7,478,757 B2* | 1/2009 | Vasic et al. | 235/491 |
| 7,487,919 B2 | 2/2009 | Giering et al. | |
| 7,529,003 B2 | 5/2009 | Fukawa | |
| 7,544,920 B2 | 6/2009 | Kunze | |
| 7,583,846 B2 | 9/2009 | Yamauchi et al. | |
| 7,599,544 B2 | 10/2009 | Moshe | |
| 7,657,112 B2 | 2/2010 | Kuwabara | |
| 7,715,613 B2 | 5/2010 | Dobbs et al. | |
| 7,737,417 B2 | 6/2010 | Giering et al. | |
| 7,864,381 B2 | 1/2011 | Scott | |
| 7,978,899 B2 | 7/2011 | Jenrick et al. | |
| 7,996,173 B2 | 8/2011 | Schowengerdt et al. | |
| 8,004,725 B2 | 8/2011 | Schnitzlein | |
| 8,125,624 B2 | 2/2012 | Jones et al. | |
| 8,184,852 B2 | 5/2012 | Hofman et al. | |
| 8,194,237 B2* | 6/2012 | Cronin et al. | 356/71 |
| 8,225,989 B1 | 7/2012 | Turocy et al. | |
| 8,229,821 B2 | 7/2012 | Mennie et al. | |
| 8,253,536 B2* | 8/2012 | Kaminska et al. | 340/5.86 |
| 8,265,346 B2 | 9/2012 | Blair | |
| 8,290,216 B1 | 10/2012 | Blair | |
| 8,306,259 B2 | 11/2012 | Wiersma | |
| 8,352,322 B2* | 1/2013 | Mennie et al. | 705/16 |
| 8,400,509 B2* | 3/2013 | Rapoport et al. | 348/161 |
| 8,433,124 B2 | 4/2013 | Blair et al. | |
| 8,509,492 B2 | 8/2013 | Blair | |
| 8,542,094 B2 | 9/2013 | Talwerdi | |
| 8,742,369 B2* | 6/2014 | Rapoport et al. | 250/458.1 |
| 2001/0006556 A1* | 7/2001 | Graves et al. | 382/135 |
| 2001/0041015 A1 | 11/2001 | Chui | |
| 2002/0097833 A1 | 7/2002 | Kaiser et al. | |
| 2002/0105654 A1 | 8/2002 | Goltsos | |
| 2002/0131618 A1* | 9/2002 | Ahlers et al. | 382/101 |
| 2003/0030785 A1 | 2/2003 | Christophersen | |
| 2003/0174878 A1 | 9/2003 | Levin | |
| 2004/0051862 A1 | 3/2004 | Alcock et al. | |
| 2004/0101211 A1 | 5/2004 | Brugger et al. | |
| 2004/0208373 A1 | 10/2004 | Aoki et al. | |
| 2005/0078851 A1 | 4/2005 | Jones et al. | |
| 2005/0129282 A1 | 6/2005 | O'Doherty et al. | |
| 2005/0178841 A1 | 8/2005 | Jones et al. | |
| 2006/0072123 A1 | 4/2006 | Wilson et al. | |
| 2006/0115139 A1 | 6/2006 | Joshi et al. | |
| 2006/0159329 A1 | 7/2006 | Joshi et al. | |
| 2006/0249951 A1 | 11/2006 | Cruikshank et al. | |
| 2007/0119950 A1 | 5/2007 | Auslander et al. | |
| 2007/0119951 A1 | 5/2007 | Auslander et al. | |
| 2007/0165208 A1 | 7/2007 | Cowburn et al. | |
| 2007/0182951 A1 | 8/2007 | Wunderer et al. | |
| 2007/0216976 A1 | 9/2007 | Endo et al. | |
| 2008/0054545 A1 | 3/2008 | Calverley et al. | |
| 2008/0116628 A1 | 5/2008 | Edwards et al. | |
| 2008/0123081 A1 | 5/2008 | Stein et al. | |
| 2008/0159587 A1 | 7/2008 | Rhoads | |
| 2008/0192992 A1* | 8/2008 | Moshe | 382/124 |
| 2009/0153926 A1 | 6/2009 | Wiltshire et al. | |
| 2009/0310126 A1 | 12/2009 | Klock et al. | |
| 2010/0073128 A1 | 3/2010 | Talwerdi | |
| 2010/0104170 A1 | 4/2010 | Joshi et al. | |
| 2010/0128964 A1 | 5/2010 | Blair | |
| 2010/0128965 A1 | 5/2010 | Blair | |
| 2010/0157280 A1 | 6/2010 | Kusevic et al. | |
| 2011/0090485 A1 | 4/2011 | Cronin et al. | |
| 2011/0121203 A1* | 5/2011 | Rapoport et al. | 250/459.1 |
| 2011/0194737 A1* | 8/2011 | Sharma et al. | 382/112 |
| 2014/0037196 A1* | 2/2014 | Blair | 382/159 |

FOREIGN PATENT DOCUMENTS

| | | |
|---|---|---|
| CN | 1950857 A | 4/2007 |
| DE | 102004035494 A1 | 2/2006 |
| EP | 1049055 A2 | 11/2000 |
| EP | 1117060 A1 | 7/2001 |
| EP | 1246876 A2 | 10/2002 |
| EP | 1429297 A1 | 6/2004 |
| EP | 1250682 B1 | 8/2008 |
| EP | 2166515 A1 | 3/2010 |
| EP | 2453382 A2 | 5/2012 |
| JP | 10-116369 | 5/1998 |
| JP | 2001236178 A | 8/2001 |
| JP | 2003-272022 | 9/2003 |
| JP | 2006053736 A1 | 2/2006 |
| KR | 1020010090049 | 10/2001 |
| KR | 20060131966 A | 12/2006 |
| KR | 1020080094426 | 10/2008 |
| WO | WO-02068945 A1 | 9/2002 |
| WO | WO-03063096 A1 | 7/2003 |
| WO | WO-2004052059 A2 | 6/2004 |
| WO | WO-2004104947 A2 | 12/2004 |
| WO | WO-2004104948 A1 | 12/2004 |
| WO | WO-2005086100 A1 | 9/2005 |
| WO | WO-2005100926 A1 | 10/2005 |
| WO | WO-2007025740 A1 | 3/2007 |
| WO | WO-2008120357 A1 | 10/2008 |

OTHER PUBLICATIONS

Non-Final Office Action date mailed Nov. 27, 2013; U.S. Appl. No. 13/609,040.
Response filed Dec. 13, 2013; U.S. Appl. No. 13/609,040.
Non-Final Office Action date mailed Dec. 26, 2013; U.S. Appl. No. 14/045,959.
Notice of Allowance date mailed Nov. 22, 2013; U.S. Appl. No. 12/872,960.
International Search Report and Written Opinion date mailed Nov. 22, 2013; PCT International Application No. PCT/US13/41581.
Chinese Office Action date mailed Mar. 1, 2013; Chinese Application No. 200980146901.9.
Notice of Allowance date mailed Apr. 15, 2013 for U.S. Appl. No. 12/683,932.
European Search Report date mailed Dec. 4, 2012; European Application No. 09830805.9.
European Search Report date mailed Dec. 4, 2012; European Application No. 09830806.7.
Chinese Office Action date mailed Mar. 20, 2013; Chinese Application No. 200980147132.4.

(56) References Cited

OTHER PUBLICATIONS

Non-Final Office Action date mailed Jul. 31, 2013 for U.S. Appl. No. 12/277,936.
Response filed Jun. 13, 2013 for U.S. Appl. No. 13/609,040.
Notice of Allowance date mailed Jul. 1, 2013 for U.S. Appl. No. 13/609,040.
Response to Office Action date mailed May 23, 2013 for U.S. Appl. No. 12/872,960.
Notice of Allowance date mailed Jun. 25, 2013 for U.S. Appl. No. 12/872,960.
International Search Report and Written Opinion date mailed Jul. 26, 2013; PCT Application No. PCT/US2011/020273.
Notice of Allowance date mailed Sep. 18, 2013 for U.S. Appl. No. 12/872,960.
RCE filed Sep. 27, 2013 for U.S. Appl. No. 13/609,040.
RCE filed Sep. 27, 2013 for U.S. Appl. No. 12/872,960.
U.S. Appl. No. 12/683,932; Final Office Action dated Sep. 19, 2012; First Named Inventor: Ronald Bruce Blair.
U.S. Appl. No. 12/984,476; Non-Final Office Action dated Sep. 10, 2012; First Named Inventor: Ronald Bruce Blair.
U.S. Appl. No. 13/539,155; Notice of Allowance dated Aug. 31, 2012; First Named Inventor: Ronald Bruce Blair.
U.S. Appl. No. 12/872,960; Election/Restriction Requirement dated Oct. 3, 2012; First Named Inventor: Alexander Parkov.
Response filed Aug. 22, 2012 for U.S. Appl. No. 12/277,936.
Final Office Action date mailed Oct. 22, 2012 for U.S. Appl. No. 12/277,936.
RCE/Response filed Feb. 19, 2013 for U.S. Appl. No. 12/277,936.
Notice of Allowance date mailed Dec. 1, 2011 for U.S. Appl. No. 12/323,109.
RCE filed Feb. 28, 2012 for U.S. Appl. No. 12/323,109.
Notice of Allowance date mailed Mar. 21, 2012 for U.S. Appl. No. 12/323,109.
RCE filed Jun. 19, 2012 for U.S. Appl. No. 12/323,109.
Notice of Allowance date mailed Jul. 12, 2012 for U.S. Appl. No. 12/323,109.
Non-Final Office Action date mailed Mar. 5, 2013 for U.S. Appl. No. 13/609,040.
RCE/Response filed Dec. 18, 2012 for U.S. Appl. No. 12/683,932.
Response filed Dec. 10, 2012 for U.S. Appl. No. 12/984,476.
Notice of Allowance date mailed Jan. 9, 2013 for U.S. Appl. No. 12/984,476.
Response filed Oct. 30, 2012 for U.S. Appl. No. 12/872,960.
Non-Final Office Action date mailed Feb. 25, 2013 for U.S. Appl. No. 12/872,960.
U.S. Appl. No. 12/277,936; Non-Final Office Action dated May 22, 2012; First Named Inventor: Ronald Bruce Blair.
U.S. Appl. No. 12/683,932; Non-Final Office Action dated May 22, 2012; First Named Inventor: Ronald Bruce Blair.
PCT/US2009/063146 Written Opinion of the International Searching Authority; Mailed Jun. 22, 2010; Applicant: De La Rue North America, Inc.
PCT/US2010/047485 Written Opinion of the International Seaching Authority; Mailed May 30, 2011; Applicant: De La Rue North America, Inc.
U.S. Appl. No. 12/277,936; Non-Final Office Action dated Jul. 20, 2011; First Named Inventor: Ronald Bruce Blair.
U.S. Appl. No. 12/277,936; Final Office Action dated Dec. 20, 2011; First Named Inventor: Ronald Bruce Blair.
PCT/US09/63148 Written Opinion of the International Searching Authority, Jun. 22, 2010, De La Rue North America.

* cited by examiner

SYSTEMS AND METHODS FOR SPECTRAL AUTHENTICATION OF A FEATURE OF A DOCUMENT

TECHNICAL FIELD

The illustrative embodiments relate generally to document authentication, and more particularly, to systems and methods for spectral authentication of a feature of a document.

BACKGROUND

The rise in technology has led to greater sophistication in the field of document authentication. Document features, such as inks, holograms, vignette windows, security threads, etc., are being increasingly used to decrease the likelihood of counterfeiting. For example, special inks, which may be applied to currency, may have a unique spectral profile that is difficult to mimic without access to sophisticated knowledge and technology, thereby decreasing the likelihood of counterfeiters copying and applying these inks to counterfeit currency. As document authentication features have become more sophisticated, a need has arisen for new methods of authenticating these and other features.

SUMMARY

According to an illustrative embodiment, a method for authenticating a feature of a document includes capturing a first image of a region of a document while the region is subjected to a first wavelength of electromagnetic radiation. The region includes at least a portion of the document. The method also includes determining a first intensity value associated with the first image of the region, and comparing the first intensity value with a first training intensity value of a region of one or more training documents. The first training intensity value is obtained using the first wavelength of electromagnetic radiation. The method also includes determining whether the document is authentic at least partially based on the comparison, between the first intensity value and the first training intensity value.

According to another embodiment, a method for authenticating a feature of a document includes determining a spectral profile of a region of a document in a predetermined electromagnetic radiation range using two or more images of the region. The region includes at least a portion of the document. Each of the two or more images are captured while the region is subjected to one of a plurality of wavelengths of electromagnetic radiation in the predetermined electromagnetic radiation range. The method also includes comparing the spectral profile of the region of the document to a training spectral profile of a region of one or more training documents, and determining whether the documents authentic based on the comparison between the spectral profile and the training spectral profile.

According to another embodiment, a system for authenticating a feature of a document includes an image sensor to capture a first image of a region of a document while the region is subjected to a first wavelength of electromagnetic radiation. The image sensor to further capture a second image of the region of the document while the region is subjected to a second wavelength of electromagnetic radiation. The region includes at least a portion of the document. The system also includes an intensity value determination module, at least partially implemented by a processor, to determine a first intensity value associated with the first image of the region. The intensity value determination module further determines a second intensity value associated with the second image of the region. The system also includes a comparison module, at least partially implemented by the processor, to compare the first intensity value with a first training intensity value of a region of a training document. The first training intensity value is obtained using the first wavelength of electromagnetic radiation. The comparison module further compares the second intensity value with a second training intensity value of the region of the training document. The second training intensity value is obtained using the second wavelength of electromagnetic radiation. The system further includes an authentication module to determine whether the document is authentic at least partially based on the comparison between the first intensity value and the first training intensity value and at least partially based on the comparison between the second intensity value and the second training intensity value.

DETAILED DESCRIPTION

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in limiting sense, and the scope of the illustrative embodiments are defined only by the appended claims.

Referring to FIGS. 1 through 4, an illustrative embodiment of a document authentication system 100 includes one or more light sources 102 and one or more image sensors 104 controlled by an image capturing module 106, which is part of a document authentication application 108, to capture one or more images 110, 112 of a region 114 of a document 116. In one example, the document 116 may be a banknote from any country of origin. Other types of documents 116 with which the document authentication system 100 may be used include financial documents (e.g., checks, money orders, travelers checks, etc.), legal-related documents, passports, or any other type of document. Unless otherwise indicated, as used herein, "or" does not require mutual exclusivity. The region 114 may include all or any portion of the document 116. Each of the images 110, 112 captured by the image capturing module 106 may be captured while the region 114 is at least partially subjected to different wavelengths of electromagnetic radiation. For example, the image 110 may be captured by the image sensor 104 while the light source 102 subjects the region 114 to a first wavelength in the electromagnetic spectrum. Further, the image sensor 104 may capture the image 112 while the light source 102 subjects the region 114 to a second wavelength that is different from the first wavelength. In this manner, the image capturing module 106 may capture any number of images of the region 114 at different wavelengths in the electromagnetic spectrum. In another embodiment, a portion of the images captured by the image capturing module 106 may be captured at the same wavelength.

Figure 1:
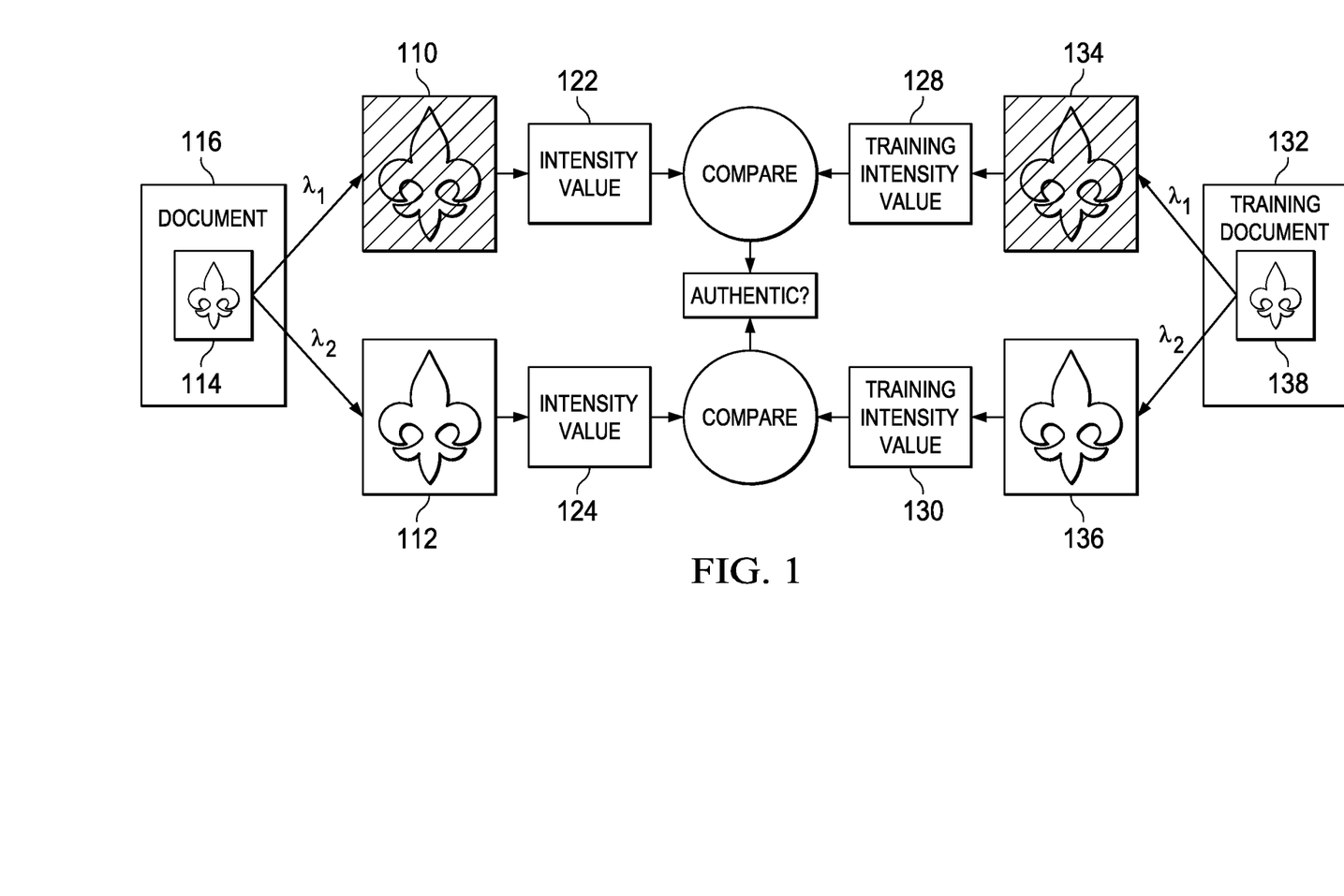
FIG. 1 is a schematic, pictorial representation of a method for authenticating a feature of a document according to an illustrative embodiment.
Figure 2:
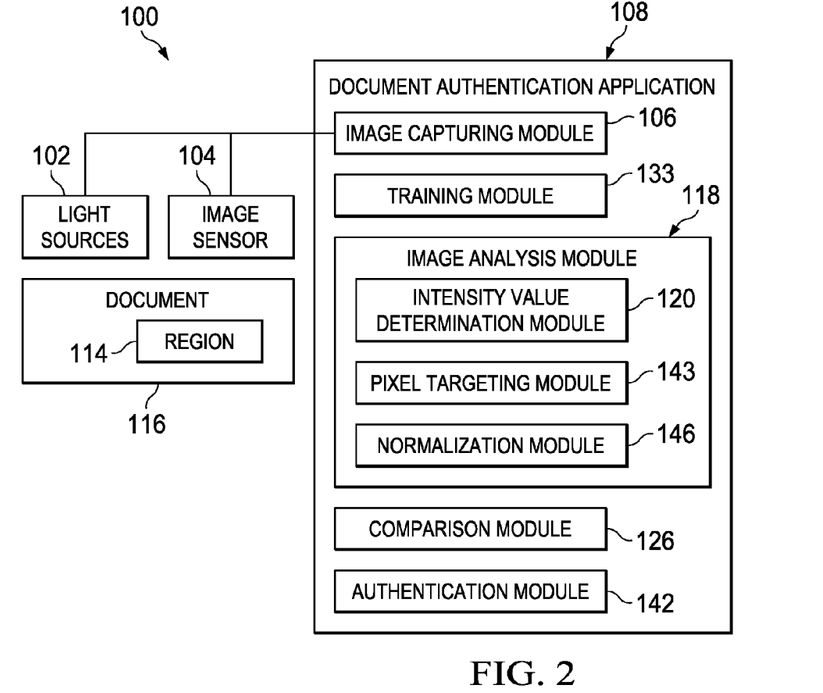
FIG. 2 is a schematic, block diagram of a document authentication system according to an illustrative embodiment.

The document authentication application 108 may include an image analysis module 118 that analyzes or processes the images 110, 112 captured by the image capturing module 106. The image analysis module 118 may include an intensity value determination module 120 that determines an intensity value 122, 124 for each of the images 110, 112, respectively. The intensity values 122, 124 may be any value indicative of the intensity or reflectivity of all or a portion of the images 110, 112, respectively. In one embodiment, the intensity values 122, 124 may be the mean intensity values of the pixels of each image 110, 112, respectively. However, other values, such as the median, maximum, minimum, average, etc., indicative of or associated with the intensity of the pixels may be used for the intensity values 122, 124.

Figure 3:
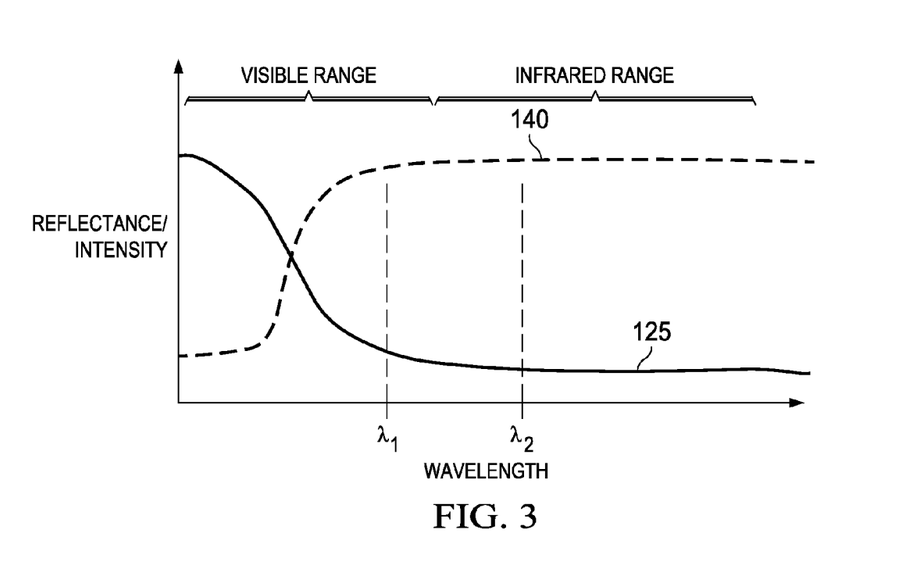
FIG. 3 is a graph showing a spectral profile of a region of a document according to one illustrative embodiment.

Referring to FIG. 3, an example spectral profile 125 of the region 114 of the document 116 is shown. The spectral profile 125 is plotted on a graph of reflectivity, or intensity, versus wavelength. The wavelength includes both the visible and infrared range, although any range in the electromagnetic spectrum may be used for the spectral profile 125. The spectral profile 125 shows that the reflectance of the region 114 varies over wavelength. In the particular example of the region 114, the spectral profile 125 sharply drops in the visible range and begins to level off in and through the infrared range. The data points of the spectral profile 125 include the intensity values 122, 124 that are determined by the intensity value determination module 120, as shown in FIG. 3. As the number of images of the region 114 is increased, the spectral profile 125 of the region 114 may be determined at higher resolutions since each image, and in particular each image's intensity value, constitutes a data point of the spectral profile 125. Therefore, in embodiment, several images may be captured of the region 114, each at different wavelengths, in order to better approximate the spectral profile 125 of the region 114. As will be discussed in further detail below, the spectral profile 125 may then be compared to a training spectral profile from one or more known authentic documents to determine whether the region 114, and therefore the document 116, has been counterfeited, deteriorated, or been damaged.

The document authentication application 108 includes a comparison module 126 that compares the intensity values (e.g., mean intensity values) 122, 124 with corresponding training intensity values 128, 130. The comparison module 126 may employ any suitable means for comparing the measured data to training data. Non-limiting illustrative examples of comparative operations that may be employed by the comparison module 126 include difference, weighted difference, correlation to determine a degree of similarity (or difference) between a measured spectral profile and a training spectral profile, statistical difference, threshold test (s), or any other suitable computation.

The training intensity values 128, 130 may be obtained from at least one training document 132 that is used as a benchmark or model to determine whether the document 116 is authentic. For example, the training document 132 may be a particular type of currency that is known to be authentic, such as currency produced by an authorized, or government-sanctioned source. A training module 133 may capture one or more images 134, 136 of a training region 138 of the training document 132 in conjunction with the image capturing module 106, the light source 102, and the image sensor 104. In another embodiment, the training module 133 may be separate from the document authentication application 108 and be implemented by a different device, authority, or entity than that used to process and authorize the document 116. The training images 134, 136 may undergo processing to determine the training intensity values 123, 130 for each of the training images 130, 136, respectively. To provide comparisons between wavelength-dependent intensities of the training document 132 and the document 116, the images 110, 112 may be captured at the same or similar wavelengths as the training images 134, 136 of the training document 132. In the example of FIG. 1, both of the images 110 and 134 are captured at a first wavelength, and the images 112 and 136 are captured at a second wavelength. The number of images captured of each the document 116 and the training document 132 may be more than two (e.g., 5, 8, 15, 100, 1000, etc.) and these images may correspond by wavelength to another in a similar manner. Also, in one embodiment, training data may be collected from a plurality of training documents, whereby an average or acceptable range may be determined for comparison with the images 110, 112.

The training intensity value 128 is indicative of an intensity of the image 134 and the training intensity value 130 is indicative of an intensity of the image 136. In one embodiment, the training intensity values 128, 130 may include a mean training intensity and a standard deviation of the mean training intensity for the images 134 and 136, respectively. However, other values, such as the median, maximum, minimum, average, etc., indicative of or associated with the intensity of the pixels may be used for the training intensity values 128, 130.

Similar to the spectral profile 125 described above, the training intensity values 128, 130 may be used to determine a training spectral profile for the training region 138 of the training document 132. The spectral profile 125 may be compared to the training spectral profile (not shown) to determine whether the document 116 is authentic. The comparison may employ any suitable means for comparing the measured data to training data. Non-limiting illustrative examples of comparative operations that may be employed include difference, weighted difference, correlation to determine a degree of similarity (or difference) between a measured spectral profile and a training spectral statistical difference, threshold test(s), or any other suitable computation. In one embodiment, the closer the spectral profile 125 of the document 116 matches the training spectral profile of the training document 132, the more likely it is that the document 116 is authentic, and thresholds may be used to determine how closely the spectral profile 125 must match the training spectral profile for the document 116 to be judged authentic. By using such a comparison between spectral profiles, special, or hard to reproduce, inks may be used on documents, such as currency, to prevent counterfeiters from easily copying features using those inks. In the example of FIG. 3, the spectral profile 140 is shown in dotted lines to illustrate a typical ink that has sometimes been used on currency; as indicated by the spectral profile 140, the ink has a simpler profile, and may therefore be easier to reproduce by counterfeiters. The spectral profile 125 of the region 114 is slightly more complex, and allows for greater likelihood that a counterfeit ink might be prevented. However, it will be appreciated that the illustrative embodiments may be used to determine the authenticity of inks having either simple or complex spectral profiles.

In one embodiment, the comparison module 126 may compare pairs of corresponding intensity values and training intensity values that are captured using the same wavelength. For example, the intensity value 122 may be compared to the training intensity value 128 since they are both captured using the first wavelength. Similarly, the intensity value 124 may be compared to the training intensity value 130 since they are obtained using the second wavelength. As more images are captured for the document 116 and the training document 132, more pairs of intensity values may be compared across a desired electromagnetic spectrum. In one embodiment, each intensity value 122, 124 is a mean intensity value, and each training intensity value 128, 130 includes both a mean training intensity value and a standard deviation of the mean training intensity value. In this example, for each of the images 110, 112, the comparison module 126 may determine the number of standard deviations the mean intensity value differs from the mean training intensity value. For example, the comparison module 126 may determine the number of standard deviations the mean intensity value 122 differs from the mean training intensity value 128. Similarly, the comparison module 126 may determine the number of standard deviations that the mean intensity value 124 differs from the mean training intensity value 130. In one embodiment, more than one training document may be used, and the standard deviation used by the comparison module may be computed over a number of training documents. The comparison may employ any suitable means for comparing the measured data to training data. Non-limiting illustrative examples of comparative operations that may be employed include difference, weighted difference, correlation to determine a degree of similarity (or difference) between a measured spectral profile and a training spectral profile, statistical difference, threshold test(s), or any other suitable computation.

Based on the comparison between the mean intensity values 122, 124 with the mean training intensity values 128, 130, respectively, an authentication module 142 may determine whether the document 116 is authentic. In one embodiment, the authentication module 142 may determine an average deviation between the mean intensity values 122, 124 and the mean training intensity values 128, 130. In particular, the authentication module 142 may use the training standard deviation of the training image 134 to determine a number of training standard deviations that the mean intensity value 122 differs from the mean training intensity value 128. Similarly, the training standard deviation of the training image 136 may be used to determine a number of training standard deviations the mean intensity value 124 differs from the mean the training intensity value 130. After taking standard deviation measurements for each pair of images as described above, the authentication module 142 may determine an average deviation. If the average deviation meets or exceeds a predetermined threshold, the document 116 may be determined to not be authentic. Conversely, if the average deviation is equal to or less than the predetermined threshold, the document 116 may be determined to be authentic. In another embodiment, the average deviation may be a weighted average.

In yet another embodiment, the authentication module 142 may determine the largest deviation between each corresponding pair of intensity values 122, 124 and training intensity values 128, 130. Specifically, the deviation may be determined between the mean intensity value 122 and the mean training intensity value 128, the mean intensity value 124 and the mean training intensity value 130, and so on for any additional pairs of images. The authentication module 142 may then determine largest deviation (e.g., most number of standard deviations) between corresponding pairs of intensity values. If the largest deviation meets or exceeds a predetermined threshold, the document 116 may be determined to be not authentic. Conversely, if the largest deviation is equal or less than the predetermined threshold, the document 116 may be determined, to be authentic.

Figure 4:
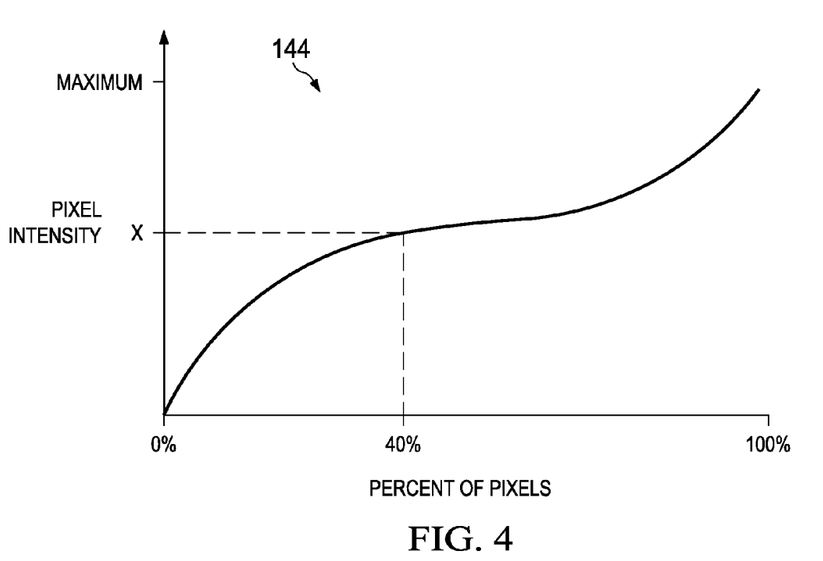
FIG. 4 is a histogram of pixel intensity versus percent of pixels used in one illustrative embodiment.

In one embodiment, using a pixel targeting module 143, a portion of the pixels of each image 110, 112 may be selected to determine respective intensity values 122, 124. Selecting which pixels to be used in calculating an intensity value may help to reduce or eliminate outlying data, such as pixels that are not part of a target feature, when determining the intensity value. In one example, a histogram 144 may be generated for each of the images 110, 112. FIG. 4 shows the histogram 144 for the image 110. The histogram 144 plots pixel intensity versus percent of pixels for the image 110. The portion of pixels in the image 110 that are used to determine the intensity value 122 may be selected using the histogram 144. As shown in FIG. 4, the dotted line indicates 40% of the pixels of the image 110 have a pixel intensity of "x" or lower. Here, "x" is a generalized representation used to show any point between the minimum and maximum pixel intensity. Any scale of pixel intensity may be used (e.g., 0 to 255, 0 to 100, etc.). In selecting the 40% of pixels of the image 110 having a pixel intensity of x or lower, only that chosen 40% is used to determine the intensity value 122 (e.g., mean intensity value). In another example, the middle 10%, 20%, 30%, 40%, 50%, etc. of pixels may be selected to determine the intensity value 122 to eliminate the darkest and brightest pixels in the image 110. Also, the brightest pixels in the image 110 may be selected using the histogram (e.g., brightest 10%, 20%, 30%, 40%, 50%, etc.). A histogram such as histogram 144 may be generated for any or all of the images 110, 112 of the region 114 so that pixel portions may be allocated differently for each wavelength. In one example, the histogram 144 may be an integrated transposed histogram.

The document authentication application 108 may also include a normalization module 146 to normalize all or a portion of the intensity values 122, 124, 128, 130. In one example, the intensity values 122 and 124, such as mean intensity values, may be normalized by selecting one of the intensity values 122 or 124 and dividing each of the intensity values 122, 124 by the selected intensity value. For example, the intensity value 122 may be selected as a normalization value, and both the intensity value 122 and the intensity value 124 may be divided by the intensity value 122. Such manner of normalization may occur for any number of intensity values for the region 114. The training intensity values 128, 130 may also be normalized. The comparison between the intensity values 122, 124 and the training intensity values 128, 130 may occur after these intensity values have been normalized. The comparison may employ any suitable means for comparing the measured data to training data. Non-limiting illustrative examples of comparative operations that may be employed include difference, weighted difference, correlation to determine a degree of similarity (or difference) between a measured spectral profile and a training spectral profile, statistical difference, threshold, test(s), or any other suitable computation. In another embodiment, normalization may occur as the images 110, 112 are captured instead of after the intensity values 122, 124 are determined.

As mentioned above, any number of images, such as the images 110 and 112, may be captured for the region 114 of the document 116, and each of these images may be compared to wavelength-corresponding training images of the training region 138 of the training document 132. By way of non-limiting example, a total of eight images may be captured for the region 114, with each of the images captured at the following respective wavelengths: red, green, blue, infrared wavelength 1, infrared wavelength 2, infrared wavelength 3, infrared wavelength 4, and infrared wavelength 5. Such wavelengths may be useful when verifying or authenticating an infrared ink that has a unique or characteristic spectral profile 125 in the visible and infrared electromagnetic range. It will be appreciated, however, that the images may be taken anywhere along the electromagnetic spectrum (e.g., gamma, ultraviolet, visible, infrared, etc.) and any number of such images may be taken for comparison with corresponding training images. The comparison may employ any suitable means for comparing the measured data to training data. Non-limiting illustrative examples of comparative operations that may be employed include difference, weighted difference, correlation to determine a degree of similarity (or difference) between a measured spectral profile and a training spectral profile, statistical difference, threshold test (s), or any other suitable computation.

In an alternative embodiment, in lieu of or in addition to comparing the intensity values 122, 124 to the training intensity values 128, 130, a "hue" may be calculated using the images 110, 112 over a predetermined wavelength range, and this hue may be compared to a corresponding training hue of the training images 134, 136 taken over substantially the same wavelength range. By way of non-limiting example, if red, green, and blue images are captured of the region 114, a hue may be calculated based on these images; a similarly calculated hue of the training region 138 may be compared to the hue calculated for the region 114 to determine whether the document 116 is authentic. However, it will be appreciated that the "hue" is not limited to being calculated in the visible range. For example, in the case that two or more images are captured of the region 114 in the infrared range, the infrared hue may be determined using these images in a similar fashion as would be done in the visible range, and then compared to a corresponding infrared hue of the training region 138 to determine document authenticity. Indeed, in this embodiment a hue may be computed in the visible range, nonvisible range, or any combination of wavelengths in the visible and nonvisible range. In this embodiment, the comparison may employ any suitable means for comparing the measured data to training data. Non-limiting illustrative examples of comparative operations that may be employed include difference, weighted difference, correlation to determine a degree of similarity (or difference) between a measured spectral profile and a training spectral profile, statistical difference, threshold test (s), or any other suitable computation.

Any number of light sources, of any type, may be used in the document authentication system 100. The light sources 102 may emit any type of electromagnetic radiation (e.g., ultraviolet, infrared, white, red, green, blue, X-ray, etc.) or other suitable electromagnetic radiation. The specific technique or components used to emit electromagnetic radiation from the light sources 102 may vary, and may include light-emitting diodes (LEDs), light bulbs, etc.

Any suitable image sensor 104 capable of capturing any suitable image (frame, line, or otherwise) of a document may be employed and remain within the scope of the present disclosure. For example, and without limitation, the image sensor 104 may be a TDI camera, a line scan camera, a frame camera, an x-ray imaging device, one or more photodiodes, etc.

Figure 5:
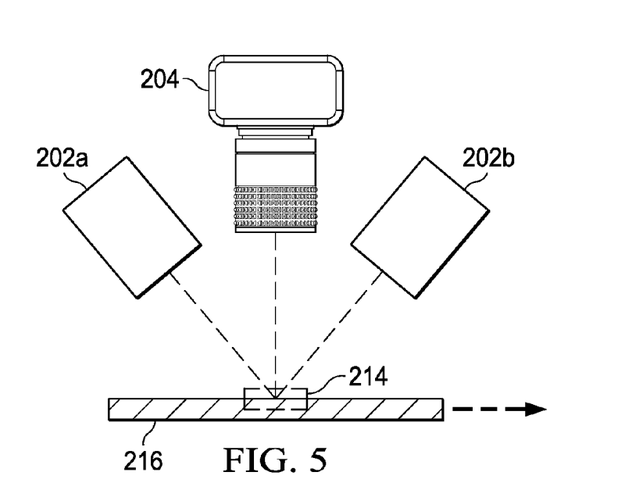
FIG. 5 is a schematic, pictorial representation of a system for capturing one or more images of a document according to an illustrative embodiment.
Figure 6A:
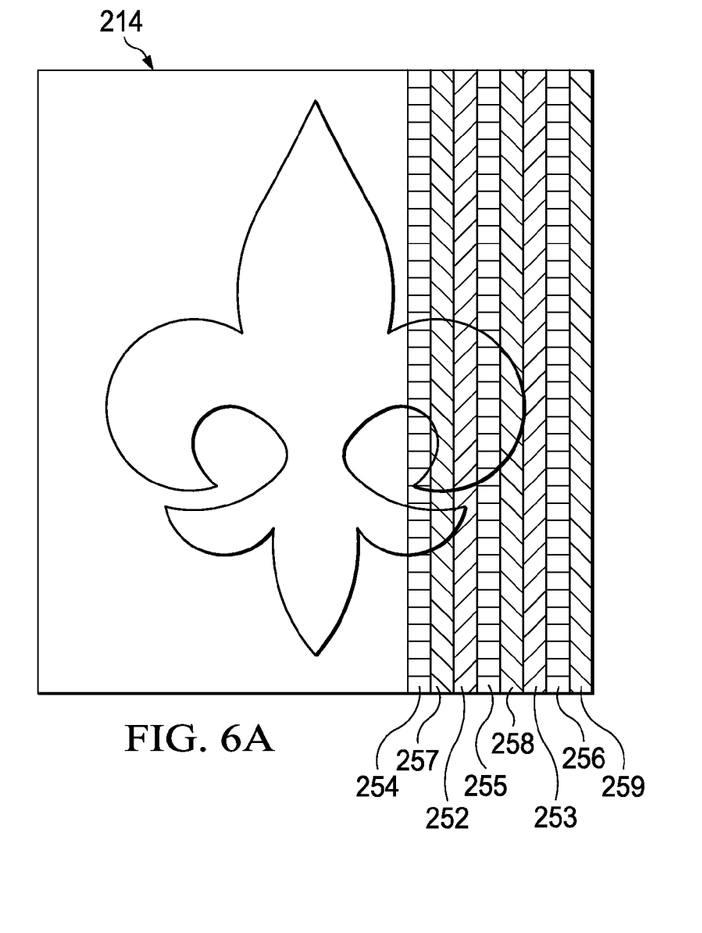
FIGS. 6A and 6B schematic, pictorial representations of how the one or more images are formed using the system of FIG. 5A according to an illustrative embodiment.
Figure 6B:
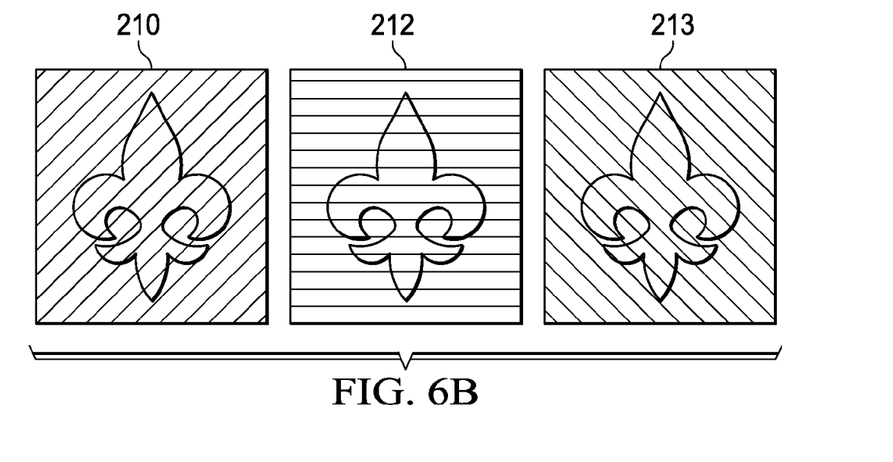

Referring to FIGS. 5, 6A, and 6B, an illustrative embodiment of a system and method for capturing images of a region 214 of a document 216 includes one or more light sources 202a, 202b and the image sensor 204. Elements of FIGS. 5, 6A, and 6B that are analogous to elements in FIGS. 1-4 have been shown by indexing the reference numerals by 100. In the non-limiting example of FIGS. 6A and 6B, three images 210, 212, 213 are captured for the region 214 of the document 216. In particular, a first plurality of line images 252, 253 may be captured of the region 214 while the region is at least partially subjected to a first wavelength of electromagnetic radiation from one of the light, sources 202a, 202b. A second plurality of line images 254, 255, 256 may be captured of the region 214 while the region 214 is at least partially subjected to a second wavelength of electromagnetic radiation. A third plurality of line images 257, 258, 259 may also be captured by the image sensor 204 while the region 214 is at least partially subjected to a third wavelength of electromagnetic radiation. Such a sequence of line images may be captured by the image sensor 204 across all or a portion of the region 214; FIG. 6A shows line images captured for a portion of the region 214 for purposes of illustration. Also, while the lines images 252-259 are shown in FIG. 6A as non-overlapping, in another embodiment all or a portion of the lines images 252-259 may overlap with one another.

The first, second, and third pluralities of line images may then be assembled into respective images 210, 212, 213 of the region 214. In particular, the line images 252 and 253, as well as any other line images captured at the first wavelength, may be assembled into the image 210, the line images 254, 255, 256, as well, as any other line images captured at the second wavelength, may be assembled into the image 212, and the line images 257, 258, 259, as well as any other line images captured at the third wavelength, may be assembled into the image 213.

In the particular case of the embodiment described in FIGS. 5, 6A, and 6B, the image sensor 204 may be a line scan camera to facilitate capturing of each of the line images. Any other arrangement capable of capturing line images may also be used (e.g., one or more photodiodes). It will be appreciated that the document 216 may move relative to the light sources 202a, 202b and the image sensor 204. Movement between the document 216, on the one hand, and the light sources 202a, 202b and the image sensor 204, on the other hand, may be due to relative movement of any of these elements. For example, the document 216 may be moved past the line of sights of the light sources 202a, 202b and the image sensor 204 by a roller belt or other means.

In one embodiment, the use of time division multiplexing (TDM) of the different light sources 202a, 202b, or other illumination techniques such as direct sequence spread spectrum modulation (DSSSM), a multi-spectral array of images spanning multiple detector spectral ranges may be formed. The use of additional lines of illumination and arrays of detectors may also be used to further extend the spectral range.

It will also be appreciated that the plurality of line images may be captured in a predetermined sequence of illumination. Also, any number of wavelengths may be utilized to form any number of line images and respective images formed therefrom, including the example provided above in which eight wavelengths (red, green, blue, infrared wavelength 1, infrared wavelength 2, infrared wavelength 3, infrared wavelength 4, and infrared wavelength 5) were used.

Figure 7:
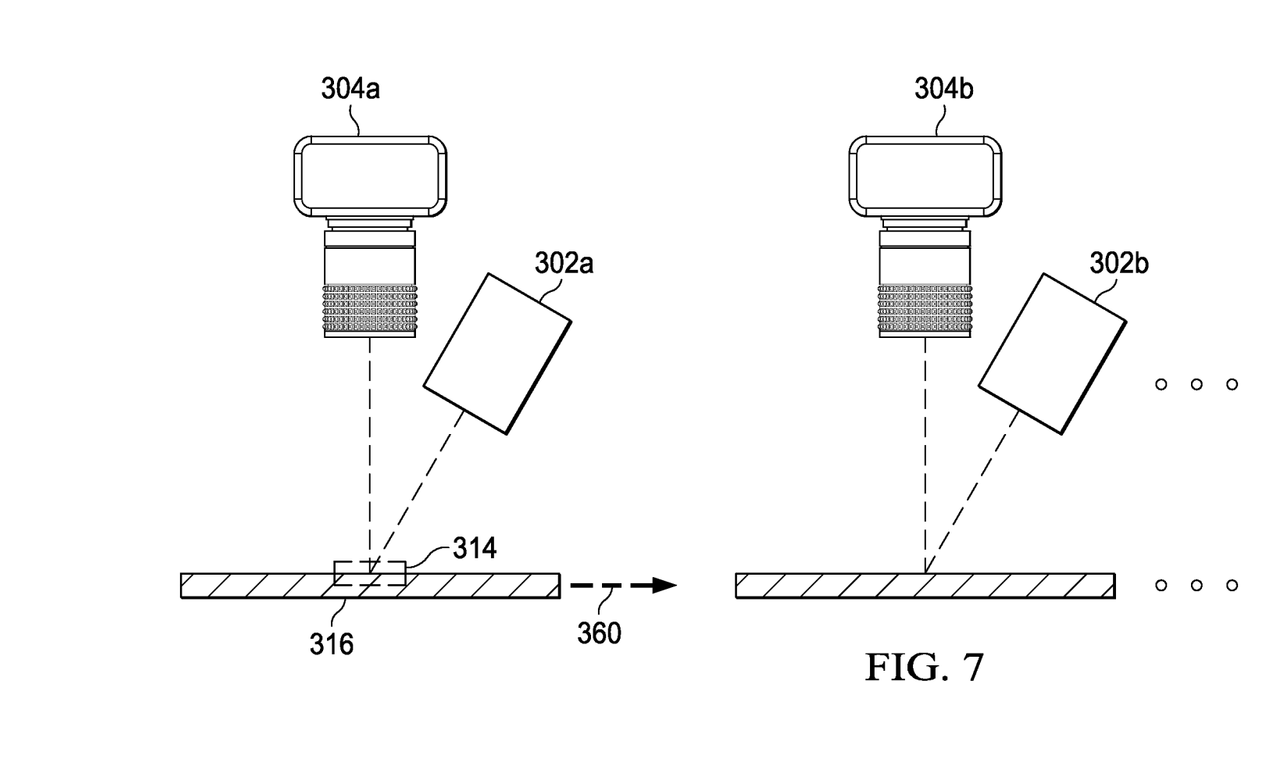
FIG. 7 is a schematic, pictorial representation of a system for capturing one or more images of a document according to an illustrative embodiment.

Referring to FIG. 7, another illustrative embodiment of capturing the images of the region 314 includes a plurality of image sensors 304*a*, 304*b* and a plurality of respective light sources 302*a*, 302*b*. Elements of FIG. 7 that are analogous to elements in FIGS. 1-4 have been shown by indexing the reference numerals by 200. In this embodiment, the document 316 may move in the direction indicated by the arrow 360 to pass in the lines of sight of each respective set of image sensors 304*a*, 304*b* and light sources 302*a*, 302*b*. When the document 316 passes before the image sensor 304*a* and light source 302*a*, the light source 302*a* may illuminate at least a portion of the region 314 with a first wavelength of electromagnetic radiation while the image sensor 304*a* captures a first image of the region 314. The document 316 may then move in the lines of sight of the image sensor 304*b* and the light source 302*b*, at which point the light source 302*b* may emit a second wavelength of electromagnetic radiation at the region 314 so that an image may be captured of the region 314 at the second wavelength by the image sensor 304*b*. This process may continue in a similar manner for any number of sets of image sensors and light sources so that any number of images may be captured in this way. While the image sensors 304*a*, 304*b* are shown perpendicular to the surface of the document 316, it will be appreciated that each image sensor(s) may be at any suitable angle relative to the document surface and/or light source(s) 302*a*, 302*b* and remain within the scope of the present disclosure Referring to FIG. 8, an illustrative embodiment of a process for authenticating a feature of the document, which may be implemented by a document authentication application such as the document authentication application 108 in FIG. 2, includes capturing a first image of the region of a document while the region is subjected to a first wavelength of electromagnetic radiation (step 401). The region may include at least a portion of the document. The process may include determining a first intensity value associated with the first image of the region (step 403). In one example, the first intensity value may be a mean intensity value of the first image.

Figure 8:
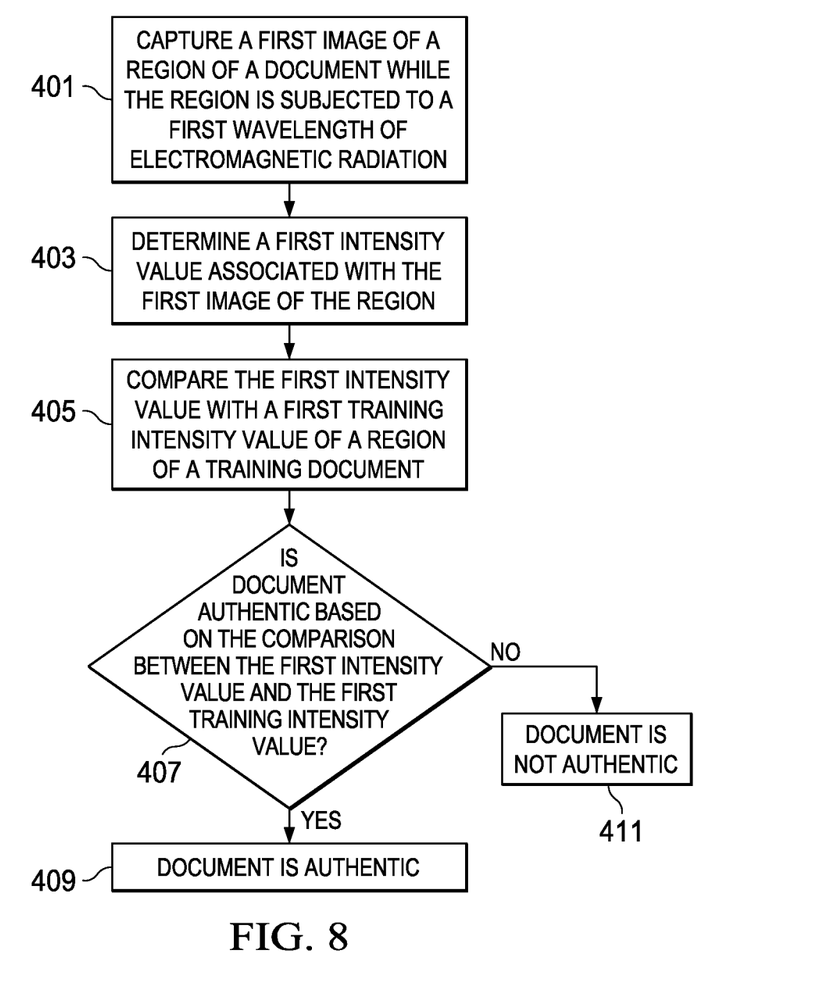
FIG. 8 is a flowchart of a process for authenticating a feature of a document according to an illustrative embodiment.

The process may also include comparing the first intensity value with a first training intensity value of a region of a training document (step 405). The first training intensity value may be obtained using the first wavelength of electromagnetic radiation. The comparison may employ any suitable means for comparing the measured data to training data. Non-limiting illustrative examples of comparative operations that may be employed include difference, weighted difference, correlation to determine a degree of similarity (or difference) between a measured spectral profile and a training spectral profile, statistical difference, threshold test(s), or any other suitable computation.

The process may also include determining whether the document is authentic based on the comparison between the first intensity value and the first training intensity value (step 407). If the process determines that the document is not authentic based on the comparison between the first intensity value and the first training intensity value, the process determines that the document is not authentic (step 411). If the process determines that the document is authentic based on the comparison between the first intensity value and the first training intensity value, the document is determined to be authentic (step 409).

Figure 9:
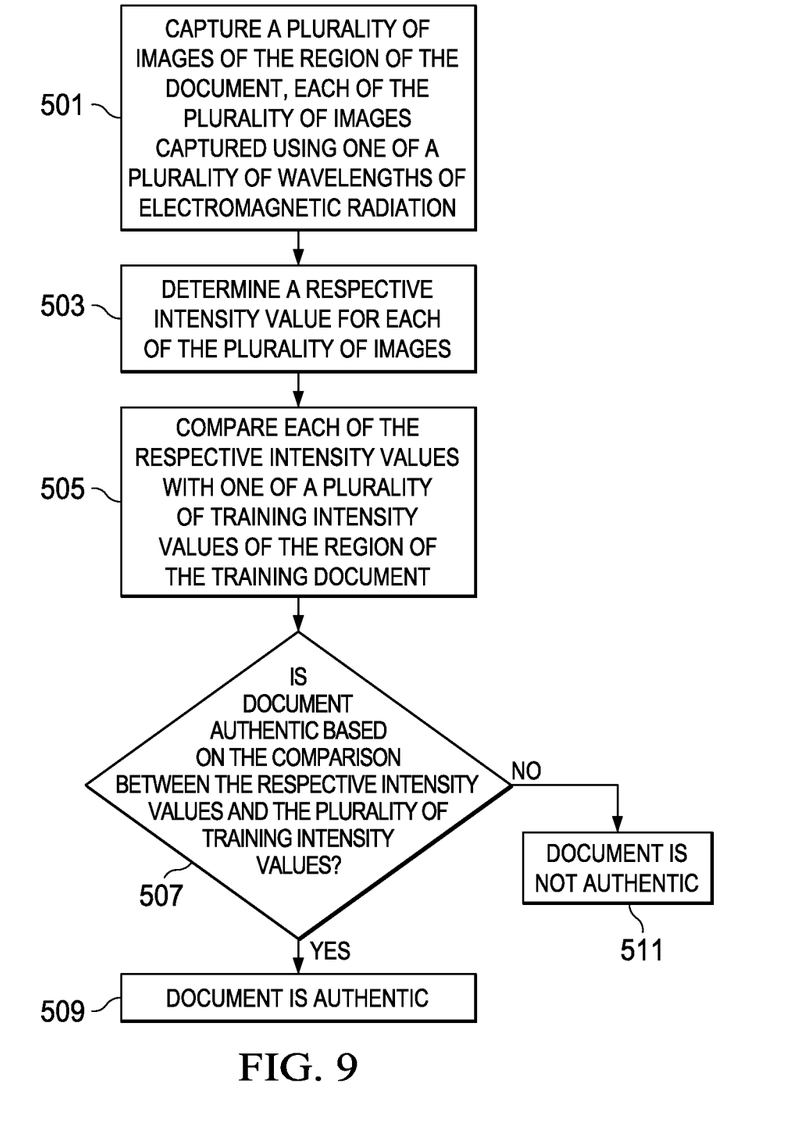
FIG. 9 is a flowchart of another process for authenticating a feature of a document according to an illustrative embodiment.

Referring to FIG. 9, an illustrative embodiment of a process for authenticating a feature of a document, which may be implemented by a document authentication application such as the document authentication application 108 in FIG. 2, includes capturing a plurality of images of a region of the document (step 501). Each of the plurality of images is captured using one of a plurality of wavelengths of electromagnetic radiation. The process may then determine a respective intensity value for each of the plurality of images (step 503). The process then compares each of the respective intensity values with one of a plurality of training intensity values of the region of the training document (step 505). Each of the plurality of training intensity values may be obtained using one of the plurality of wavelengths of electromagnetic radiation. Each pair of respective intensity value and training intensity value that are compared to one another is obtained using substantially the same wavelength. The comparison may employ any suitable means for comparing the measured data to training data. Non-limiting illustrative examples of comparative operations that may be employed include difference, weighted difference, correlation to determine a degree of similarity (or difference) between a measured spectral profile and a training spectral profile, statistical difference, threshold test(s), or any other suitable computation.

The process determines whether the document is authentic based on the comparison between the respective intensity values and the plurality of training intensity values (step 507). If the process determines that the document is authentic based on the comparison between the respective intensity values and the plurality of training intensity values, then the document is determined to be authentic (step 509). If the process determines document is not authentic based on the comparison between the respective intensity values and the plurality of training intensity values, then the document is determined to not be authentic (step 511).

Figure 10:
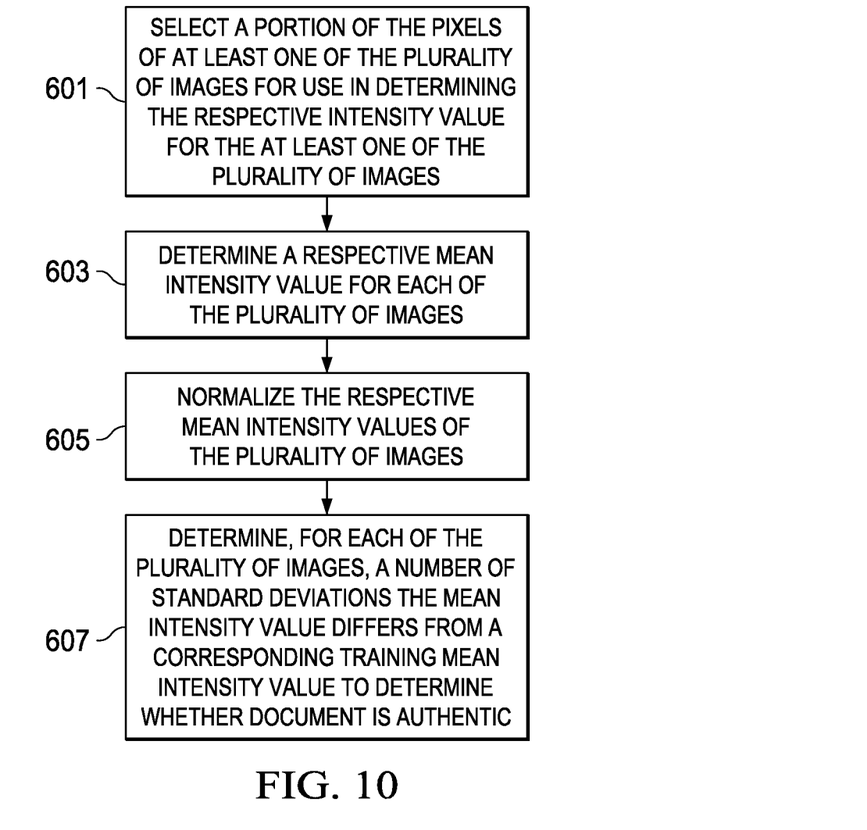
FIG. 10 is a flowchart of a process for determining a respective intensity value for each of the plurality of images and for determining whether a document is authentic according to an illustrative embodiment.

Referring to FIG. 10, an illustrative embodiment of a process for implementing steps 503 and 505 in FIG. 9 includes selecting a portion of the pixels of at least one of the plurality of images for use in determining the respective intensity value for the at least one of the plurality of images (step 601). The process includes determining a respective mean intensity value for each of the plurality of images (step 603). The process also includes normalizing the respective mean intensity values of the plurality of images (step 605). The process also determines, for each of the plurality of images, a number of standard deviations the mean intensity value differs from a corresponding training mean intensity value to determine whether the document is authentic (step 607).

Figure 11:
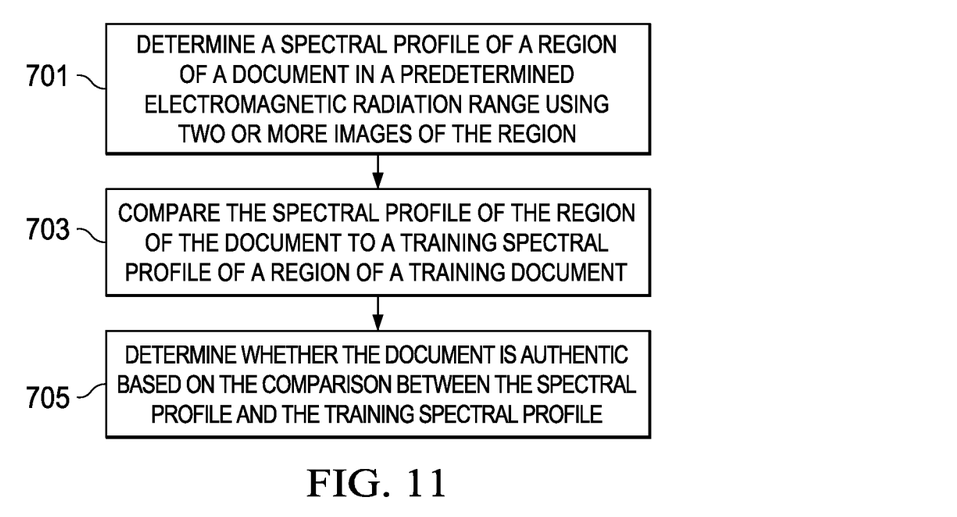
FIG. 11 is a flowchart of another process for authenticating a feature of a document according to an illustrative embodiment.

Referring to FIG. 11, an illustrative embodiment of a process for authenticating a feature of a document, which may be implemented by a document authentication application such as the document authentication application 108 in FIG. 2, includes determining a spectral profile of a region of a document in a predetermined electromagnetic radiation range using two or more images of the region (step 701). Each of the two or more images may be captured while the region is subjected to one of a plurality of wavelengths of electromagnetic radiation in the predetermined electromagnetic range. The process also includes comparing the spectral profile of the region of the document to a training spectral profile of a region of a training document (step 703). The comparison may employ any suitable means for comparing the measured data to training data. Non-limiting illustrative examples of comparative operations that may be employed include difference, weighted difference, correlation to determine a degree of similarity (or difference) between a measured spectral profile and a training spectral profile, statistical difference, threshold, test(s), or any other suitable computation. The process also includes determining whether the document is authentic based on the comparison between the spectral profile and the training spectral profile (step 705).

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. In some alternative implementations, the function or functions noted in the block may occur out of the order noted in the Figures. For example, in some cases, two blocks shown in succession may be executed substantially concurrently, or the blocks may sometimes be executed in the reverse order, depending upon the functionality involved.

Figure 12:
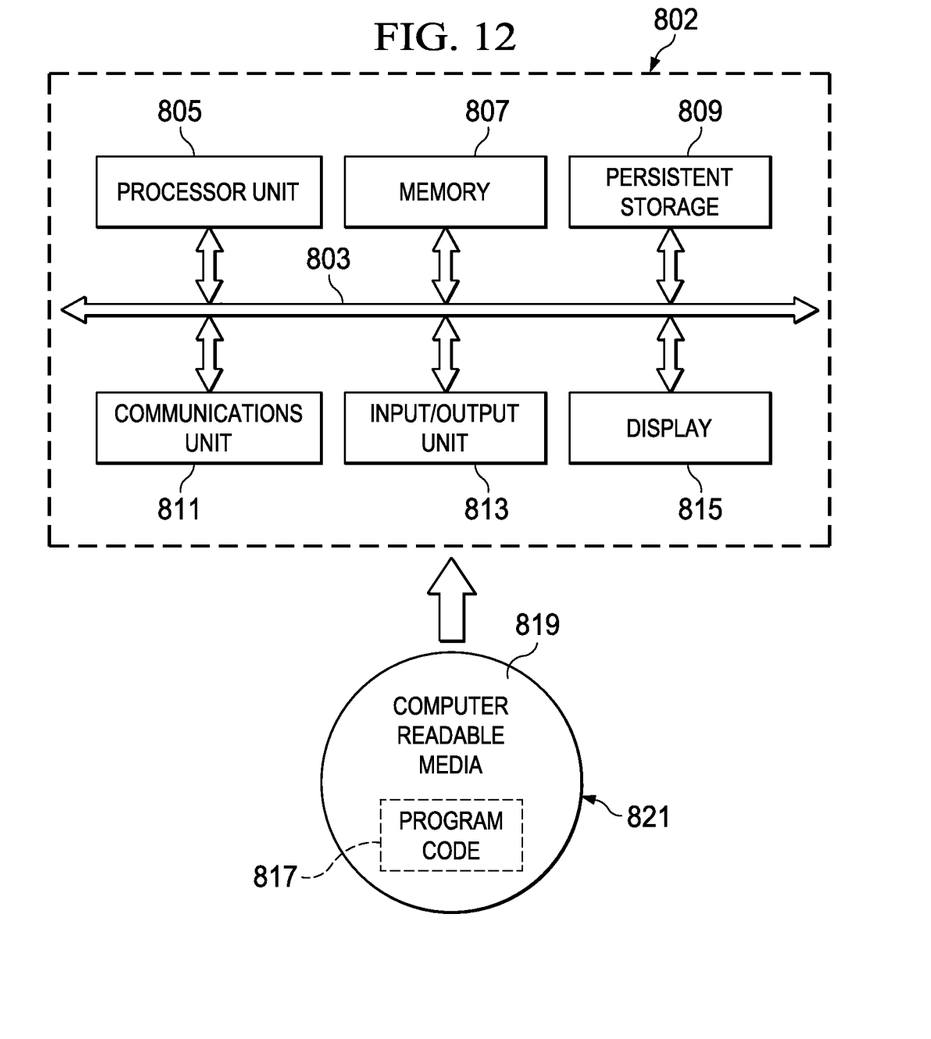
FIG. 12 is a schematic, block diagram of a data processing system in which the illustrative embodiments may be implemented.

Referring to FIG. 12, a block diagram of a computing device 802 is shown in which the illustrative embodiments may be implemented. In one embodiment, the document authentication application 108 described in FIG. 2 may be implemented on the computing device 802. Computer-usable program code or instructions implementing the processes used in the illustrative embodiments may be located on the computing device 802. The computing device 802 includes a communications fabric 803, which provides communications between a processor unit 805, a memory 807, a persistent storage 809, a communications unit 811, an input/output (I/O) unit 813, and a display 815.

The processor unit 805 serves to execute instructions for software that may be loaded into the memory 807. The processor unit 805 may be a set of one or more processors or may be a multi-processor core, depending on the particular implementation. Further, the processor unit 805 may be implemented using one or more heterogeneous processor systems in which a main processor is present with secondary processors on a single chip. As another illustrative example, the processor unit 805 may be a symmetric multi-processor system containing multiple processors of the same type.

The memory 807, in these examples, may be, for example, a random access memory or any other suitable volatile or non-volatile storage device. The persistent storage 809 may take various forms depending on the particular implementation. For example, the persistent storage 809 may contain one or more components or devices. For example, the persistent storage 809 may be a hard drive, a flash memory, a rewritable optical disk, a rewritable magnetic tape, or some combination of the above. The media used by the persistent storage 809 also may be removable. For example, a removable hard drive may be used for the persistent storage 809.

The communications unit 811, in these examples, provides for communications with other data processing systems or communication devices. In these examples, the communications unit 811 may be a network interface card. The communications unit 811 may provide communications through the use of either or both physical and wireless communication links.

The input/output unit 813 allows for the input and output of data with other devices that may be connected to the computing device 802. For example, the input/output unit 813 may provide a connection for user input through a keyboard and mouse. Further, the input/output, unit 813 may send output to a processing device. In the case in which the computing device 802 is a cellular phone, the input/output unit 813 may also allow devices to be connected to the cellular phone, such as microphones, headsets, and controllers. The display 815 provides a mechanism to display information to a user, such as a graphical user interface.

Instructions for the operating system and applications or programs are located on the persistent storage 809. These instructions may be loaded into the memory 807 for execution by the processor unit 805. The processes of the different embodiments may be performed by the processor unit 805 using computer-implemented instructions, which may be located in a memory, such as the memory 807. These instructions are referred to as program code, computer-usable program code, or computer-readable program code that may be read and executed by a processor in the processor unit 805. The program code in the different embodiments may be embodied on different physical or tangible computer-readable media, such as the memory 807 or the persistent storage 809.

Program code 817 is located in a functional form on a computer-readable media 819 and may be loaded onto or transferred to the computing device 802 for execution by the processor unit 805. The program code 817 and the computer-readable media 819 form computer program product 821 in these examples. In one embodiment, the computer program product 821 is the document authentication application 108 described in FIG. 2. In this embodiment, the program code 817 may include computer-usable program code capable of capturing a first image of a region of a document while the region is subjected to a first wavelength of electromagnetic radiation. The region includes at least a portion of the document. The program code 817 may also include computer-usable program code capable of determining a first intensity value associated with the first image of the region, and comparing the first intensity value with a first training intensity value of a region of a training document. The first training intensity value is obtained using the first wavelength of electromagnetic radiation. The program code 817 may also include computer-usable program code capable of determining whether the document is authentic at least partially based on the comparison between the first intensity value and the first training intensity value.

In another embodiment, the program code 817 may include computer-usable program code capable of determining spectral profile of a region of a document in a predetermined electromagnetic radiation range using two or more images of the region. The region includes at least a portion of the document. Each of the two or more images is captured while the region is subjected to one of a plurality of wavelengths of electromagnetic radiation in the predetermined electromagnetic radiation range. The program code 817 may also include computer-usable program code capable of comparing the spectral profile of the region of the document to a training spectral profile of a region of a training document, and determining whether the document is authentic based on the comparison between the spectral profile and the training spectral profile. Any combination of the above-mentioned computer-usable program code may be implemented in the program code 817, and any functions of the illustrative embodiments may be implemented in the program code 817.

In one example, the computer-readable media 819 may be in a tangible form, such as, for example, an optical or magnetic disc that is inserted or placed into a drive or other device that is part of the persistent storage 809 for transfer onto a storage device, such as a hard drive that is part of the persistent storage 809. In a tangible form, the computer-readable media 819 also may take the form of a persistent storage, such as a hard drive or a flash memory that is connected to the computing device 802. The tangible form of the computer-readable media 319 is also referred to as computer recordable storage media.

Alternatively, the program code 817 may be transferred to the computing device 802 from the computer readable media 819 through a communication link to the communications unit 811 or through a connection the input/output unit 313. The communication link or the connection may be physical or wireless in the illustrative examples. The computer-readable media 819 also may take the form of non-tangible media, such as communication links or wireless transmissions containing the program code 817. In one embodiment, the program code 817 is delivered to the computing device 802 over the Internet.

The different components illustrated for the computing device 802 are not meant to provide architectural limitations to the manner in which different embodiments may be implemented. The different illustrative embodiments may be implemented in a data processing system including components in addition to or in place of those illustrated for computing device 802. Other components shown in FIG. 12 can be varied from the illustrative examples shown.

As one example, a storage device in the computing device 802 is any hardware apparatus that may store data. The memory 807, the persistent storage 809, and the computer-readable media 819 are examples of storage devices in a tangible form.

In another example, a bus system may be used to implement the communications fabric 803 and may be comprised of one or more buses, such as a system bus or an input/output bus. Of course, the bus system may be implemented using any suitable type of architecture that provides for a transfer of data between different components or devices attached to the bus system. Additionally, the communications unit 811 may include one or more devices used to transmit and receive data, such as a modem or a network adapter. Further, a memory may be, for example, the memory 807 or a cache such as found in an interface and memory controller hub that may be present in the communications fabric 803.

As used herein, including in the claims, the terms first, second, third, etc. . . . used in relation to an element (e.g., first wavelength, second wavelength, etc.) are for reference or identification purposes only, and these terms, unless otherwise indicated, are not intended to describe or suggest a number, order, source, purpose, or substantive quality for any element for which such a term is used.

Although the illustrative embodiments described herein have been disclosed in the context of certain illustrative, non-limiting embodiments, it should be understood that various changes, substitutions, permutations, and alterations can be made without departing from the scope of the invention as defined by the appended claims. It will be appreciated that any feature that is described in a connection to any one embodiment may also be applicable to any other embodiment.

What is claimed is:

1. A system for authenticating a feature of a document, the system comprising:
    an electromagnetic radiation emitter for subjecting the document with different first and second wavelengths of electromagnetic radiation;
    an image sensor to capture a first image of a region of the document while the region is subjected to the first wavelength of electromagnetic radiation, the image sensor to further capture a second image of the region of the document while the region is subjected to a the second wavelength of electromagnetic radiation, the region comprising at least a portion of the document;
    an intensity value determination module, at least partially implemented by a processor, to determine a first intensity value associated with the first image of the region, the intensity value determination module to further determine a second intensity value associated with the second image of the region;
    a comparison module, at least partially implemented by the processor, to compare the first intensity value with a first training intensity value of a region of a training document, the first training intensity value obtained using the first wavelength of electromagnetic radiation, the comparison module to further compare the second intensity value with a second training intensity value of the region of the training document, the second training intensity value obtained using the second wavelength of electromagnetic radiation; and
    an authentication module to determine whether the document is authentic at least partially based on the comparison between the first intensity value and the first training intensity value and at least partially based on the comparison between the second intensity value and the second training intensity value.

* * * * *